WILLIAM JOHN CUNNINGHAM.
Improvement in Sawing-Machines.
No. 128,024. Patented June 18, 1872.

3 Sheets--Sheet 3.

WILLIAM JOHN CUNNINGHAM.
Improvement in Sawing-Machines.

No. 128,024.  Patented June 18, 1872.

Witnesses.
J. H. Shumway
A. J. Tibbits

Wm. J. Cunningham
Inventor
By Atty.
John S. Earle 128,024

UNITED STATES PATENT OFFICE.

WILLIAM JOHN CUNNINGHAM, OF LONDON, ENGLAND.

IMPROVEMENT IN SAWING-MACHINES.

Specification forming part of Letters Patent No. 128,024, dated June 18, 1872.

*To all whom it may concern:*

Be it known that I, WILLIAM JOHN CUNNINGHAM, of London, in the Kingdom of England, have invented new and useful "Improvements in Sawing-Machines;" and I do hereby declare that the following is a full and exact description thereof, reference being had to the figures on the accompanying three sheets of drawing and to the letters and numerals marked thereon.

My improvements in sawing-machines relate to that class of machines used for fret and other ornamental and shaped work.

Figure 1:
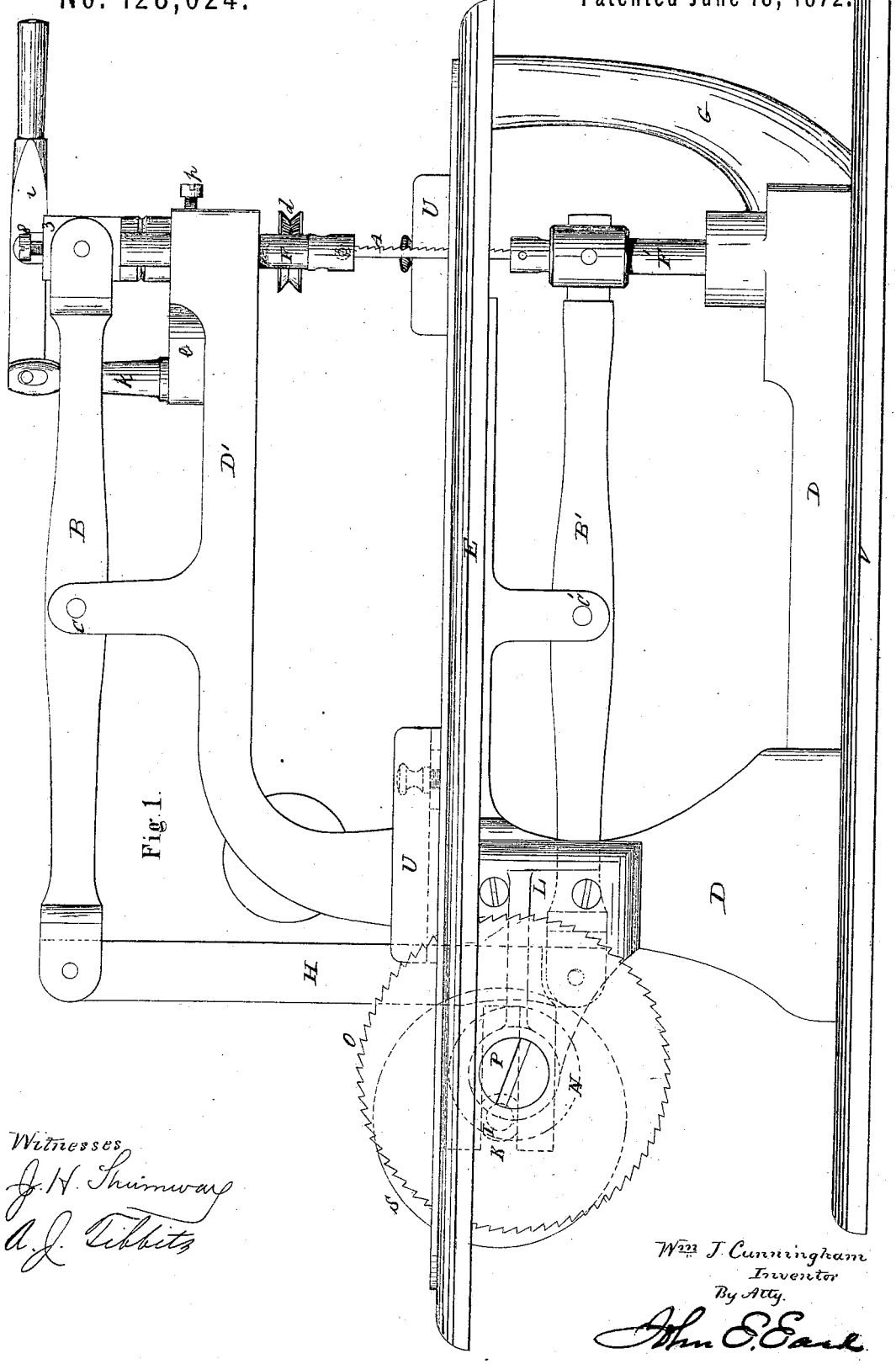
Figure 3:
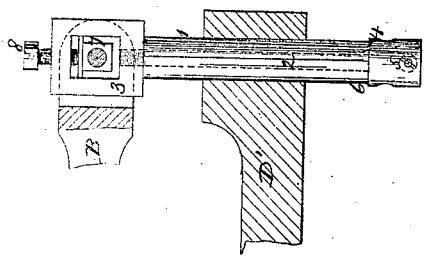

For this purpose I mount a saw, A, Figures 1 and 3, (which for fine work is necessarily very narrow,) between two levers, or beams, B B', the upper lever B being pivoted on a fulcrum C at about midway and mounted on the arm or frame D' of the machine, while the lower lever B' is parallel and similarly mounted on a fulcrum, C', fixed to the under side of the frame D, supporting the table E. The levers or beams B B' are pivoted to two bars or pieces, F F', the bar F working in a vertical guide in the arm D', and the bar F' in a guide in the lower part D. The upper bar F, shown more in detail in Fig. 3, is a cylinder, 1, through which runs a spindle, 2, the upper end of which is formed with a screw and screws into the block 3, the lower end of the spindle having jaws 4, to which the saw A is fixed by means of a screw, 5, and the shoulders 6 of this spindle above the jaws support the cylinder 1; the whole being tightened and held together by means of the screw on the end of the spindle 2, which screws into the block 3, which block has a rectangular hole or slot, in which there is a square block, 7, with a circular hole through which the upper lever or beam B is pivoted, and the area of the block 7 is less than the area of the hole in block 3. Above the square block 7, and extending across the whole length of the hole in the block 3, I place a thin plate, which is adjusted by the screw 8, which thin plate, by the action of the screw, is pressed down on the block 7, and allows a movement from right to left as communicated by the vibrations of the lever or beam pivoted through the circular hole in the block 7.

Figure 5:
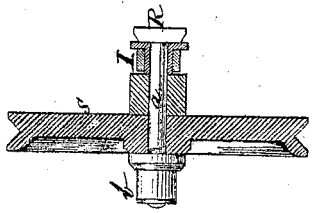

The end of the lever or beam B, where it is pivoted to the bar F, carrying the reciprocating saw, describes an arc of a circle, but as the saw must have a perpendicular stroke the circular motion of the extremity of the lever or beam B is counteracted by the motion from right to left of the block 7, as communicated by the perpendicular motion of the bar F in the guide in the arm D' of the machine. The reciprocating saw A passes through a hole in the table E, which table I prefer to cast with the frame D D D', the form of the frame somewhat resembling a single-armed press, but lighter, the arm D being of such length as to suit the work to be taken in. The extreme end of the table is cast to a foot, G, having a hole or guide to guide the lower bar F', to which the saw A is fixed. The back ends of the levers B B' are connected together by a rod, H, to which an up-and-down motion is given by means of a block, I, working in a horizontal slot, K, formed on the connecting-rod H. To the frame is cast or fixed an arm, L, having a hole or bearing, in which there is a shaft, M, carrying a pulley, N, a disk-wheel, Q, and a circular saw, O, the pulley N being connected by a band with a pulley on a shaft worked by any motive power. The circular-saw is connected to the pulley N, and therefore it is always usable when the machine is in motion, the saw being fixed by a left-hand screw, P, to the pulley N, and the wheel Q is fixed to the shaft M by the screw g. The wheel Q has a slot extending across its face, and in the slot there is a plate, R, Figs. 2 and 5, of less length than the slot. To the plate R is fixed a stud, a, carrying a pulley, S, and a cylinder on which there is a block, I, placed in a slot in a bracket on the connecting-rod, and the parts are held together by the nut b. The distance of block I from the axis of the actuating pulley N determines the stroke of the levers or beams B B' carrying the reciprocating saw A, and as the plate R is of less length than the slot in the face of the wheel Q, it can be moved so that the stud a can be placed immediately over the axis or center of the shaft M, or be moved to the right or left without the plate projecting beyond the circumference of the wheel Q.

Figure 2:
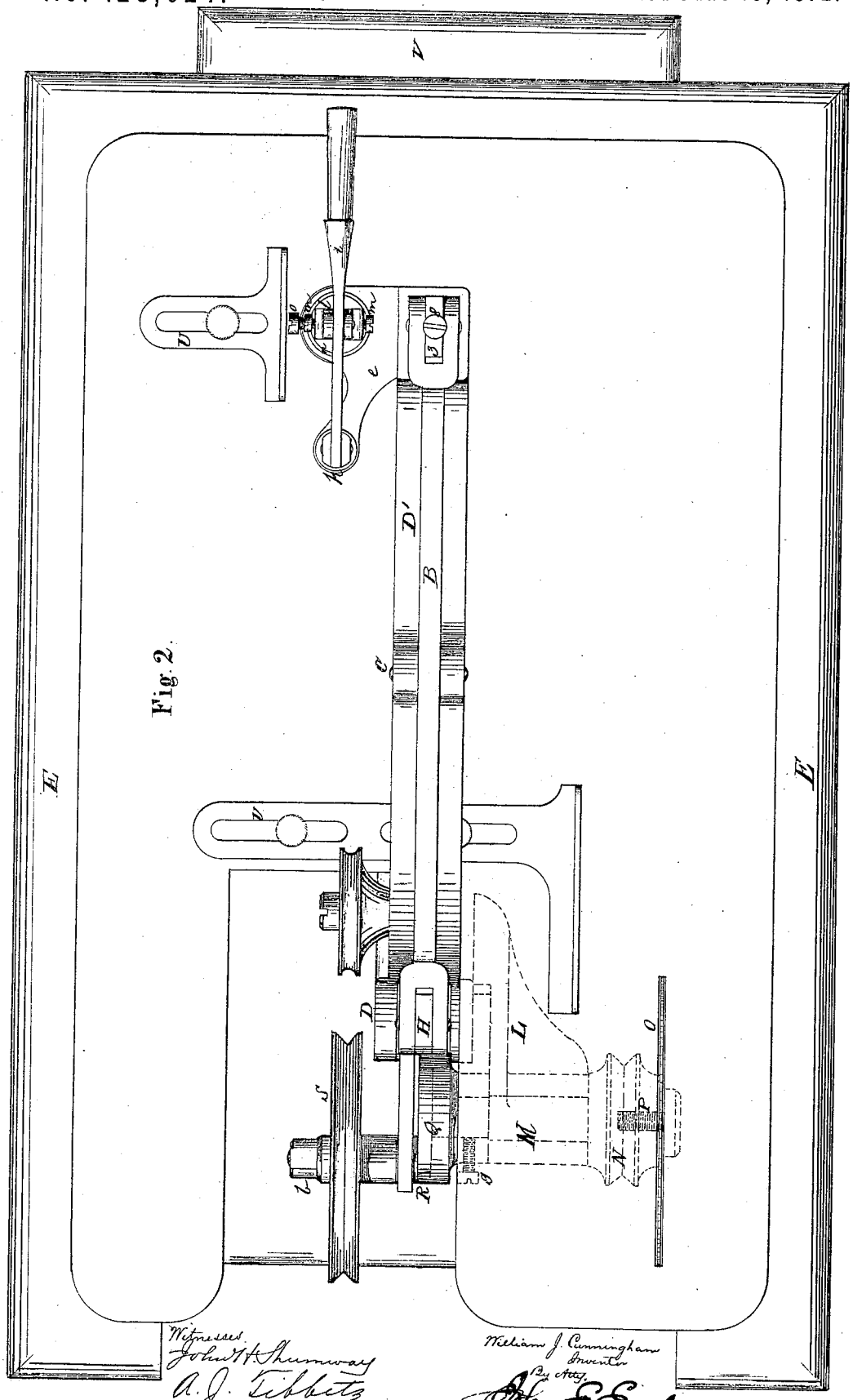
Figure 4:
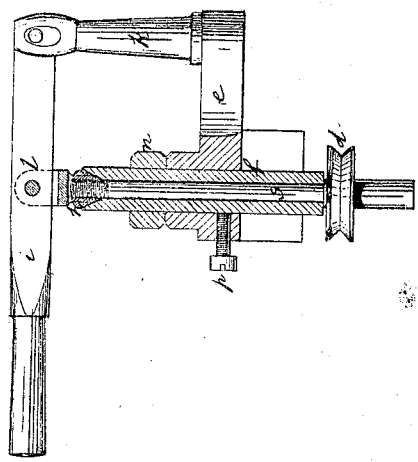

When the stud a on the plate R is placed immediately over the axis or center of the shaft M there is no crank movement, and consequently no motion is communicated to the levers or beams B B' carrying the reciprocating saw A, and the center of the pulley S is identical with the centre of the pulley N, and therefore the pulley S can have a band communicating with a pulley, $d$, Figs. 1, 2, and 4, for turning a drill connected to a spindle, $g$, which passes through a cylinder, $f$, fitted in the bearing $e$. The spindle $g$ has a screw at the end. There is a conical nut, $h$, which fits on being screwed up into a concavity in the upper end of the cylinder $f$, and it will be seen that the conical nut $h$ revolves in the concavity when the spindle is actuated. The cylinder and drill are moved up and down by a handle or lever, $i$, connected, by a joint, $l$, and screws $m$, to the cylinder $f$, and the fulcrum of the handle is placed in the upright standard $k$. The power of the hand is applied to the handle to raise or lower the drill according to the depth or thickness of the material which is required to be drilled, the distance being regulated by the collar $n$ having a screw, $o$.

By means of another screw, $p$, fitted in the frame, the cylinder $f$ is kept fast, so that the drill can neither be raised or lowered, though the spindle $g$ carrying the drill still revolves in the cylinder $f$. It will be seen that the drill and the reciprocating fret-saw A cannot be used at the same time, for, when the crank movement necessary for working the saw is in operation, the shaft $a$ of the pulley S has an eccentric and circular motion round the axis of the pulley N. When the pin or spindle $a$, mounted on the plate K, is placed on one side of the axis of the wheel N, by moving the plate R to the right or left in the slot in the face of the wheel Q it becomes a crank and gives the required motion to the reciprocating saw A by means of the block in the slot K formed on the connecting-rod H, the block moving to the right or left in the slot K, and up and down as the disk-wheel Q revolves. To saw out the fret-work it is simply necessary to place the piece of material on the table with the lines or figures on it, to be followed by the saw A, and when the machine is set to work the operator presses the wood or material up to it, following the lines or device required to be cut out, and to guide the material operated upon. I form the frame single, and, in order to keep the levers and parts central therein I core and cast open the spaces required to be occupied by the several working parts, which, with the frame or casting being all in one piece, renders the whole compact and of economical construction.

As before mentioned, the circular saw is always usable when the machine is in motion, but I do not lay any claim to this part of the invention.

But what I do claim is—

The combination of the vibrating levers B B', the vertically-guided bars F F' carrying the saw A, when the said levers are attached to the said bars by means of the block 7, and open head or block 3, as and for the purpose specified.

In testimony whereof I have hereunto set my hand in presence of two subscribing witnesses.

WILLIAM JOHN CUNNINGHAM.

Witnesses:
  E. J. HUGHES,
    123 *Chancery Lane, London.*
  W. A. BARLOW,
    123 *Chancery Lane, London.*